United States Patent [19]
Schultz et al.

[11] 3,737,348
[45] June 5, 1973

[54] HEADEND SUSPENSION FOR A CARPET ROLL SOLID PROPELLANT GRAIN

[75] Inventors: Seiford F. Schultz; James H. Higgins, both of Huntsville, Ala.

[73] Assignee: The United States of America as represented by the Secretary of the Army, Washington, D.C.

[22] Filed: Dec. 29, 1970

[21] Appl. No.: 102,313

[52] U.S. Cl. .................. 149/2, 102/100, 102/103, 156/330, 149/97
[51] Int. Cl. ............................................ C06b 19/00
[58] Field of Search ................. 149/2, 97; 102/99–101, 103; 156/330

[56] References Cited

UNITED STATES PATENTS

| | | | |
|---|---|---|---|
| 2,978,377 | 4/1961 | Hall et al. | 102/103 X |
| 3,108,433 | 10/1963 | DeFries et al. | 102/103 X |
| 2,978,308 | 4/1961 | Keller | 102/100 X |
| 3,021,748 | 2/1962 | Miller | 102/100 X |
| 3,067,686 | 12/1962 | Coover et al. | 102/101 X |
| 3,159,104 | 12/1964 | Hodgson | 102/101 |
| 3,276,379 | 10/1966 | Pallett | 102/100 |
| 3,309,249 | 3/1967 | Allen | 149/2 X |
| 3,375,147 | 3/1968 | Sparks et al. | 149/2 X |
| 3,496,870 | 2/1970 | Fulmer | 149/2 X |

*Primary Examiner*—Carl D. Quarforth
*Assistant Examiner*—P. A. Nelson
*Attorney*—Harry M. Saragovitz, Edward J. Kelly, Herbert Berl and Jack W. Voigt

[57] ABSTRACT

Disclosed is a means for headend suspension of a carpet roll solid propellant grain used in high acceleration rocket motors. The disclosed means for headend suspension includes a supporting member (e.g. headend plate) having an intermediate reinforcing media through which a bonding agent securely bonds the carpet roll grain to a headend plate which is then attached to the rocket motor case wherein used.

4 Claims, 3 Drawing Figures

PATENTED JUN 5 1973  3,737,348

Seiford L. Schultz
James H. Higgins,
INVENTORS.

BY

HEADEND SUSPENSION FOR A CARPET ROLL SOLID PROPELLANT GRAIN

BACKGROUND OF THE INVENTION

Solid propellant rocket motors have been made in many sizes and shapes. The solid fuel portion commonly referred to as the grain, has also been formed into many varied shapes. Solid propellant grains have been grouped by certain configurations, some of which include: end burning, tubular, internal burning star, rod and tube, and cruciform. A restrictor material or inhibitor may be applied to portions of the grain to provide burning as desired and in the direction to produce large volumes of gases which eventually are discharged through an exit nozzle to provide thrust from the rocket motor and for the system to which the rocket motor is secured, such as a missile, a payload or the like.

More recently, a grain configuration known as the carpet roll type has been utilized in high acceleration rocket. The grain is generally formed in sheets or layers and rolled into a shape such as the shape appearance of a rolled carpet or scroll. The grain may be provided with reinforcing media such as a woven screen with or without inhibitor coating. The carpet roll grain can then be placed in a motor bottle or motor case and the accessory fixtures, such as a nozzle at the aft-end and a payload at the forward section may be attached in accordance with design procedures known in the art.

The prior art method used to retain a carpet roll grain in place has included aft-end traps of various forms. The traps may be constructed from either metal or non-metal and machined to proper fit and tolerances. Some designs have employed inert spacers to assist in maintaining constant annulas. The use of the inert spacers and aft-end traps have caused variations in the annulas structure contours in the area of the exit nozzle. These variations have caused fluctuations in the high pressure gas flow pattern exiting through the nozzle. A constant annulas is more desirable since the rocket would not require the more elaborate corrective systems for maintaining the control desired for a particular flight or thrust level control.

Therefore, an object of this invention is to provide a suspension system for a carpet roll grain which eliminates the need for aft-end traps and associated machining operations.

Another object of this invention is to provide a suspension system which yields a single method of maintaining a constant annulas without the need for inert spacers.

A further object of this invention is to provide a suspension system which results in a lower cost and in a lighter weight for the end use product.

SUMMARY OF THE INVENTION

A solid propellant carpet roll grain is bonded to a suspension media which is provided with means for attaching for headend suspension of the bonded grain within a rocket motor bottle or motor case. The headend suspension of the grain eliminates the metal traps and machining operations required by the prior art means for retaining a grain within the motor case during the burning process.

DESCRIPTION OF THE PREFERRED EMBODIMENT

Figure 1:
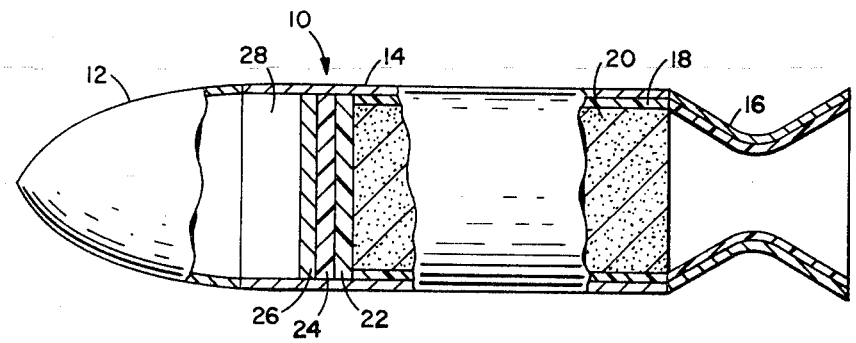
FIG. 1 is a view, partially in section, of a solid propellant rocket motor having a headend suspended carpet roll grain assembly within the motor case.

With reference to the drawing, FIG. 1, there is shown a solid propellant rocket motor 10 which includes a payload or forward section 12 removably secured to a motor case or bottle 14 having a headend section and an aft-end section with a nozzle 16 removably secured at the aft-end section of the motor case. Shown within the motor case is insulation 18 when required in accordance with design and material used for motor case construction. For example, in fiberglass case structure, the case serves as insulation. A carpet roll solid propellant grain 20 is shown in association with bonding media 22 (epoxy-amino amide of a fatty acid copolymer) and the reinforced suspension material 24 which is affixed to the headend plate 26 which is mechanically attached within the motor case at the desired position. The thickness of reinforced suspension material 24 is a function of grain size length. A filler material or vacant space 28 may be provided which is also a function of grain size length.

Figure 2:
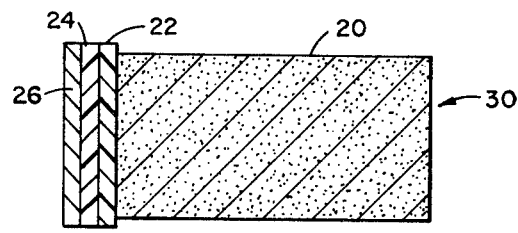
FIG. 2 is a sectional view of a bonded carpet roll grain assembly.

With reference to the drawing, FIG. 2, there is shown an assembly 30 comprised of the carpet roll grain 20 and the associated parts identified by like numbers as set forth in FIG. 1 and in the description thereof.

Figure 3:
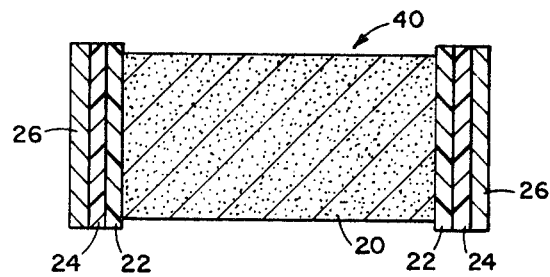
FIG. 3 is a sectional view of a bonded carpet roll grain assembly.

With reference to the drawing, FIG. 3, there is shown an assembly 40 comprised of the carpet roll grain 20 and the associated parts identified by like numbers as set forth in FIG. 1 and in the description thereof, but illustrating a headend plate bonded to an opposite and second end of the grain.

The structure of this invention may be fabricated by selecting a headend plate 26 which is preferably a light weight, high strength material having adequate thickness to rigidily support the carpet roll grain when bonded thereto. Bonding is achieved by means of the reinforced suspension material 24 comprised of fiberglass cloth or netting and the bonding media 22, a copolymer formed from an epoxy compound and a coreactant (an amino amide of a fatty acid) which securely bonds the carpet roll grain to the headend plate.

A typical commercial epoxy resin, such as Epon 828, a liquid with an epoxide equivalent of from about 175–210, average moleculer weight of about 350–400, and a viscosity at 25°C of about 5,000–15,000 centipoises is used in the amount of about 70 parts with an epoxy coreactant of about 30 parts (e.g. a fatty amido amine, also referred to as an amino amide of a fatty acid, such as Genamid 2,000) to form a copolymer which securely bonds together the carpet roll grain, the fiberglass cloth or netting and the headend plate.

The use of epoxy compounds of the type described are well known and are particularly suited for intimately bonding to metals or non-metals. Also, the time for curing of the epoxy copolymers is well known so that sufficient pot life time is obtainable for the size structure to be bonded.

Amino amides of fatty acids serve as the coreactant with epoxy compounds to form crosslinked copolymers. The copolymers possess the desirable properties for the use in accordance with this invention. These properties include good performance under conditions of thermal shock, and under vibration, and good adhesive strength to metal and non-metals.

The inspection of the bonded assembly of the carpet roll grain indicates that a secure bond is achieved in one zone between the epoxy copolymer and the propellant grain and in another zone between the copolymer and the headend plate with reinforcement of fiberglass impregnated with the copolymer between the headend plate and the grain. The described means for bonding results in a holding strength which surpasses the strength of the propellant itself thereby ensuring a very satisfactory bond between the carpet roll and headend plate. The headend plate can be removably attached to the motor case by small metal parts or other well known parts for attachment.

This invention is particularly advantageous for use in carpet roll eject motors where high accelerations subjects the motor to conditions requiring grain retention means to keep the grain in place. This invention provides a means for suspension which permits the fastening of grains of lengths shorter than the motor cases thereby providing additional benefit with respect to total thrusts which can be obtained from a commonly designed motor case.

The means for headend suspension of a carpet roll grain may be used in a single moulded case having a dome shaped headend with a removably attached nozzle. The means for headend suspension of a carpet roll grain may be used in a single moulded case having a case plus nozzle as a single structure to permit fastening of the bonded carpet roll assembly at the headend and subsequently closing the opening with a dome closure plate. The systems for fastening nozzles, payload, or dome closures are many and varied, and well known in the art, however, the bonded carpet roll assembly of this invention is contemplated as being adaptable for use with all rocket motors designed for carpet roll grains.

Applicant contemplates other uses for his disclosed suspension system. For example a plate (e.g. headend plate) could be bonded at the end of a carpet roll to serve as a means for securely holding the grain while performing physical or chemical testing. Also, it is contemplated that a carpet roll could be securely bonded at each end, for either testing or an assist in manufacturing, i.e., after bonding, carpet roll could be cut in between the bonded plates to thereby yield two carpet roll grain assemblies of the same or different lengths.

I claim:

1. A carpet roll solid propellant grain assembly comprising a carpet roll solid propellant grain securely bonded on one end with a bonding media to a reinforced suspension material affixed to a headend plate, said bonding media being comprised of a copolymer formed from an epoxy resin combined with an epoxy coreactant, said epoxy coreactant being an amino amide of a fatty acid, said reinforced suspension material being fiberglass impregnated with said copolymer, and said headend plate being of adequate thickness to rigidly support said bonded carpet roll solid propellant grain.

2. The carpet roll solid propellant grain assembly of claim 1 wherein said copolymer is formed from about 70 parts of an epoxy resin, characterized by having an epoxide equivalent of from about 175–210 and by having an average molecular weight of about 350–400, combined with about 30 parts of said epoxy coreactant.

3. The carpet roll solid propellant grain assembly of claim 2 in combination with a rocket motor comprised of a motor case having a forward end section and an aft-end section, said aft-end section being provided with a nozzle; said assembly being fastened to said motor case at said headend plate to provide headend suspension for said grain assembly within said motor case.

4. The carpet roll solid propellant grain assembly of claim 2 and additionally including a headend plate, of like structure to said first recited headend plate, securely bonded to an opposite and second end of said grain.

* * * * *